United States Patent Office 3,004,952
Patented Oct. 17, 1961

3,004,952
HARDENABLE COMPOSITIONS COMPRISING EPOXIDE COMPOUNDS AND BORON TRIFLUORIDES
Hans Brueschweiler, Basel, and Paul Zuppinger, Arlesheim, Switzerland, assignors to Ciba Limited, Basel, Switzerland
No Drawing. Filed Mar. 23, 1959, Ser. No. 800,944
Claims priority, application Switzerland Mar. 25, 1958
6 Claims. (Cl. 260—47)

It is known that 1:2-oxido-compounds, such as ethylene oxide, epichlorhydrin or 1:3-[2':3'-oxidopropyl]-hydroxybenzene, can be reacted with tetrahydrofurane in the presence of Friedel-Crafts catalysts or boron trifluoride.

Owing to the fact that tetrahydrofurane itself polymerizes in the presence of Friedel-Crafts catalysts or boron trifluoride, the above known process does not lead to homogeneous hardened products. Furthermore, the reaction of epoxides with tetrahydrofurane proceeds so violently that strong local over-heating and carbonization of the hardened resin occur in large batches.

The invention is based on the unexpected observation that tetrahydrofurane does not itself polymerize in the presence of boron trifluoride, if a small proportion of water or a nitrogeneous base is also present. On the other hand, the presence of one of the latter substances does not prevent the reaction with the compound containing epoxide groups, and merely retards the speed of the reaction. This has the advantage that undesired over-heating and the disadvantageous influence on the properties of the reaction products connected therewith can be avoided more easily.

Accordingly, the present invention provides hardenable compositions which comprise an epoxide compound, which contains n epoxide groups calculated on the average molecular weight, n being a whole number or fractional number greater than 1, tetrahydrofurane, boron trifluoride, and a small proportion of water and/or a nitrogenous base as a moderator or moderators capable of forming a stable complex or complexes with boron trifluoride.

The invention also provides a process for the manufacture of hardened resins, wherein an epoxide compound as defined above is reacted with tetrahydrofurane in the presence of a small proportion of water and/or a nitrogenous base as a moderator or moderators capable of forming a stable complex or complexes with boron trifluoride.

The epoxide compounds used in the invention have a 1:2-epoxy equivalency greater than 1.0. By the epoxy-equivalency reference is made to the average number of 1:2-epoxy-groups

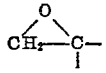

contained in the average molecule of the epoxide compound. Owing to the usual methods of preparation of the epoxide compounds and the fact that they are ordinarily a mixture of chemical compounds having somewhat different molecular weights and contain some compounds wherein the terminal epoxy groups are in hydrated form, the epoxy equivalency of polyepoxy compounds is not necessarily an integer of at least 2, but in all cases it is a value greater than 1.0.

As epoxide compounds of the kind defined above, which are to be reacted with tetrahydrofurane, there may be mentioned, for example, epoxidated diolefines, dienes or cyclic dienes, such as butadiene dioxide, 1:2:5:6-diepoxy-hexane and 1:2:4:5-diepoxy-cyclohexane; epoxidated diolefinically unsaturated carboxylic acid esters, such as methyl 9:10:12:13-diepoxy-stearate; the dimethyl ester of 6:7:10:11-diepoxy-hexadecane-1:16-dicarboxylic acid; epoxidated compounds containing two cyclohexenyl radicals, such as diethylene glycol bis-(3:4-epoxy-cyclohexane carboxylate) and 3:4-epoxy-cyclohexyl-methyl-3:4-epoxy-cyclohexane carboxylate. Furthermore basic polyepoxide compounds, such as are obtained by the reaction of a primary or secondary aromatic diamine, such as aniline or 4:4'-di-[monomethylamino]-diphenylmethane, with epichlorhydrin in the presence of an alkali.

There may also be used polyglycidyl esters, such as are obtainable by the reaction of a dicarboxylic acid with epichlorhydrin or dichlorhydrin in the presence of an alkali. Such polyesters may be derived from aliphatic dicarboxylic acids, such as oxalic acid, succinic acid, glutaric acid, adipic acid, pimelic acid, suberic acid, azelic acid, sebacic acid and especially aromatic dicarboxylic acids, such as phthalic acid, isophthalic acid, terephthalic acid, 2:6-naphthylene-dicarboxylic acid, diphenyl-ortho:ortho'-dicarboxylic acid, ethylene glycol-bis-(para-carboxyphenyl)ether or the like. There may be mentioned, for example, diglycidyl adipate and diglycidyl phthalate and also diglycidyl esters which correspond to the average formula

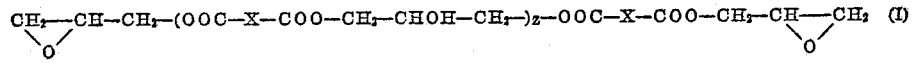 (I)

in which X represents an aromatic hydrocarbon radical, such as a phenyl group, and Z represents a whole or fractional small number.

There may also be used polyglycidyl ethers such as are obtainable by the etherification of a polyhydric alcohol or polyphenol with epichlorhydrin or dichlorohydrin in the presence of an alkali. These compounds may be derived from glycols, such as ethylene glycol, diethylene glycol, triethylene glycol, propylene glycol-(1:2), propylene glycol-(1:3), butylene glycol-(1:4), pentane-diol-(1:5), hexane-diol-(1:6), hexane-triol-(2:4:6) or glycerine, and especially from polyphenols, such as phenol novolacs, creasol novolacs, resorcinol, pyrocatechol, hydroquinone, 1:4-dihydroxynaphthalene, bis-[4-hydroxyphenyl]-methane, bis-[4-hydroxyphenyl]-methyl-phenylmethane, bis-[4-hydroxyphenyl]-tolyl-methane, 4:4'-dihydroxy-diphenyl, bis-[4-hydroxyphenyl]-sulfone and especially 2:2-bis-[4-hydroxyphenyl]-propane. There may be mentioned, for example, ethylene glycol diglycidyl ether and resorcinol diglycidyl ether and also diglycidyl ethers which correspond to the average formula (II) 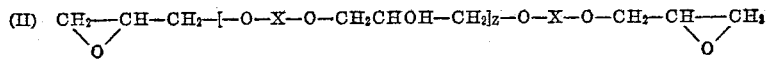

in which X represents an aromatic radical, and Z represents a whole or fractional small number.

There are especially suitable epoxy-resins that are liquid at room temperature, for example, those of 4:4'-dihydroxydiphenyl-dimethylmethane which have an epoxide content of about 3.8 to 5.8 epoxide equivalents per kilogram. Such epoxy-resins correspond, for example, to the average formula

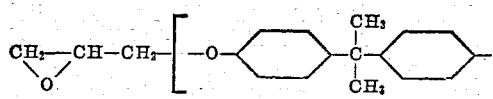 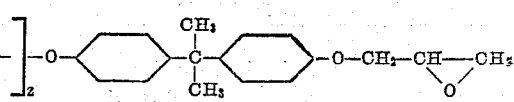

in which Z represents a whole or fractional small number, for example, between 0 and 2.

Alternatively, solid epoxy-resins may be used in the molten state or in solution.

The boron trifluoride may be incorporated with the composition as such, but it is of advantage first to convert it into a complex thereof. For example, a stable complex of boron trifluoride with water or a nitrogenous base may first be prepared. The complex may be diluted with tetrahydrofurane, whereby a stable non-polymerizing solution is obtained which may be mixed with the epoxide compound shortly before use.

Alternatively, the boron trifluoride may first be dissolved in a quantity of the tetrahydrofurane in excess of the stoichiometric quantity required for the formation of a complex, and which tetrahydrofurane contains the necessary small proportion of the nitrogenous base or water, for example, at least 1 percent and advantageously 2–5 percent of water calculated on the tetrahydrofurane.

As moderators there may be used nitrogenous bases capable of forming stable complexes with boron trifluoride. As such nitrogen bases there may be mentioned, for example, ammonia, ethylamine, ethylene diamine, monoethanolamine, piperidine, triethanolamine, urea, hexamethylene tetramine, trimethylamine, pyridine and especially aromatic amines, such as aniline, toluidine and Schiff's bases of such amines. It is preferable to use as moderator either a Schiff's base of an aromatic amine and an aromatic aldehyde, for example, the Schiff's base from aniline and benzaldehyde, or water, which moderators form stable complexes with boron trifluoride. Boron trifluoride and water form, for example, stable liquid hydrates, such as $BF_3 \cdot H_2O$ and $BF_3 \cdot 2H_2O$. When water is used as moderator the hardening takes place exothermically at room temperature. When the Schiff's base of an aromatic amine and an aromatic aldehyde is used hardening takes place only if heat is applied, for example, it takes place exothermically after heating the composition up to about 60° C. On the other hand, at room temperature hardening takes place only after long standing and without the detectable evolution of heat, which may be desirable in certain cases. In addition to retarding the speed of the copolymerization, the presence of a small proportion of water also suppresses the harmful coagulation that frequently occurs when the epoxide compound is mixed with an anhydrous solution of boron trifluoride in tetrahydrofurane, and which leads to non-homogeneous hardening. It may therefore be of advantage to use water and a nitrogenous base together as moderators. The relative proportions of epoxide compound and tetrahydrofurane may vary within wide limits. For certain uses the proportion of tetrahydrofurane may be small and of the order of magnitude necessary for the formation of relatively stable complexes with boron trifluoride. This quantity corresponds, for example, generally to an excess of tetrahydrofurane amounting to approximately 10 times the stoichiometric quantity necessary for complex formation. Tests have shown that it is of advantage to use, for example, at least 5 parts of such a solution of 10% of boron trifluoride in tetrahydrofurane for every 100 parts of a polyglycidyl ether of 4:4'-dihydroxy-diphenyl-dimethylmethane having an epoxide content of 4.03 epoxide equivalents per kilogram, that is to say, 1.25 grams of boron trifluoride per gram equivalent of epoxide groups.

Preferably a large proportion of tetrahydrofurane is reacted with the epoxide compound, the ratio of epoxide-compound to tetrahydrofurane being within the range of about 100:5–50, and advantageously 100:10–30. There are advantageously used at most one mol of tetrahydrofurane per epoxide compound.

The proportion of the water or nitrogenous base used as moderator may also vary within certain limits. There may be used a proportion smaller than the stoichiometric proportion required for the formation of a 1:1-complex with the boron trifluoride. In the case of the preferred combination of boron trifluoride and water, there is advantageously used at least about 0.2, and preferably 0.5–3.0, parts by weight of water for every 1 part by weight of boron trifluoride.

The hardenable compositions of the invention may also contain suitable plasticisers or inert diluents. An addition of a plasticiser, such as dibutyl phthalate, dioctyl phthalate or tricresyl phosphate, yields a softer, elastic and flexible hardened composition. It may also be of advantage, depending on the properties desired in the hardened resin, to use an active diluent or modifying agent which reacts with the epoxy-resin under the influence of the boron trifluoride and takes part in the hardening reaction, for example, an ethylenically unsaturated polymerizable compound, such as styrene or a monoepoxide compound, such as cresyl glycide; and there may also be incorporated under the influence of the boron trifluoride a monofunctional or advantageously polyfunctional compound, which contains a hydroxyl group, keto group, aldehyde group, carboxyl group or the like, such, for example, as a dihydric or polyhydric alcohol, a polyglycol or a polyester having terminal hydroxyl or carboxyl groups.

The compositions of this invention may also contain the usual additions, such as accelerators, for example, styrene oxide or organic peroxides, pigments, extenders or fillers. As extenders and fillers there may be used, for example, asphalt, bitumen, glass fibers, mica, quartz meal, kaolin or finely divided silicic acid (Aerosil) or aluminum powder. Thus, for example, a solution of the complex of boron trifluoride and water or a nitrogenous base in tetrahydrofurane may be worked up with an inorganic filler to form a hardener paste, which is mixed with the epoxide resin or a mixture of the epoxide resin and tetrahydrofurane shortly before use.

The hardenable compositions of this invention may be used for the manufacture of rapidly hardening adhesives, lamination resins, lacquer coatings, casting resins and moulding compositions. Compositions of this invention which contain pigments or fillers of all kinds, such as finely divided silicic acid, and also plasticizers, are very suitable as filling compositions and putty-like masses.

The following examples illustrate the invention:

Example 1

67.8 grams of boron trifluoride gas were introduced, while cooling with ice, into 36 grams of water. 15.3 grams of the boron trifluoride dihydrate so formed, and which contained 10 grams of boron trifluoride, were made up to 100 cc. with tetrahydrofurane. The resulting solution of the boron trifluoride-water-tetrahydrofurane complex remained water-clear and of limited stability. No polymerization of the tetrahydrofurane took place.

5 grams of the above solution and 15 grams of tetrahydrofurane were mixed with 100 grams of a liquid epoxide resin having an epoxide content of 5.2 epoxide equivalents per kilogram and obtained in known manner by the alkaline condensation of 4:4'-dihydroxydiphenyldimethylmethane with epichlorhydrin. The mixture hardened at 20° C. after 3 minutes with the evolution of heat. A solid cast body so obtained had the following properties:

Impact bending strength_____ 16 cm. kg. per squ. cm.
Bending strength_____ 6.4 kg. per squ. mm.
Martens value_____ 56° C.
Absorption of water_____ 0.35%.

A cast body measuring 60 x 10 x 3 mm., when heated for 72 hours at 100° C., lost 0.4% of its original weight.

*Example 2*

100 grams of the liquid epoxide resin used in Example 1 were mixed with 5 grams of dibutyl phthalate and 30 grams of tetrahydrofurane, and the resulting thinly liquid mixture was sprayed as resin component by means of a two component spray gun together with 5 grams of the solution of a boron trifluoride-water-tetrahydrofurane complex used in Example 1 as hardening component on to an etched sheet of aluminum. A dust-dry lacquer coating was obtained at 20° C. after 7 minutes. The lacquer coating so formed had an Erichson value of 6.3 mm. The lacquer coating suffered no change when subjected to the action of concentrated hydrochloric acid or caustic soda solution of 10% strength after two hours.

By spraying the above resin-hardener mixture by means of a 2-component spray gun on to a fabric of glass fibers, the sprayed fabric can be worked up in the usual manner to a glass fiber laminate of good impact bending strength and bending strength.

*Example 3*

100 grams of the epoxide resin used in Example 1 and 15 grams of tetrahydrofurane were mixed with a mixture of 0.5 gram of boron trifluoride, 1.0 gram of water and 5 grams of tetrahydrofurane. The hardening time of the resulting mixture at 20° C. was 10 minutes. The mixture can be used as a lacquer, which when applied to a ground and defatted sheet of aluminum, hardened at room temperature in 10–15 minutes to a dust dry lacquer film of good flexibility and adhesion, which is insoluble in organic solvents.

*Example 4*

10 grams of a boron trifluoride-aniline complex are dissolved in 100 grams of tetrahydrofurane. 20 grams of the resulting solution were mixed with 95 grams of the epoxide resin used in Example 1 and 5 grams of butylglycide. The thinly liquid mixture so obtained was hardened in 12 hours at 60° C. in a closed mould. The hardened cast body measuring 60 x 10 x 3 mm., when heated for 90 hours at 100° C., lost 1.52% of its original weight.

*Example 5*

100 grams of the liquid epoxide resin used in Example 1 were thoroughly mixed with 7 grams of a boron trifluoride hardener solution of 8% strength prepared as described below. In 24 hous the mixture became a highly viscous gel. It was then hardened for 3 hours at 110° C. and there was obtained a cast body having the following properties:

Impact bending strength_____ 3.7 cm. kg. per squ. cm.
Bending strength_____ 4.8 kg. per squ. mm.
Absorption of cold water (4
  days at 20° C.)_____ 0.25%.
Martens value (DIN)_____ 89° C.

The boron trifluoride-hardener solution referred to above was prepared as follows: 10 grams of benzal-aniline were dissolved in 36 cc. (35 grams) of a solution of 10% strength of boron trifluoride in tetrahydrofurane, in which the boron trifluoride was present as boron trifluoride dihydrate.

*Example 6*

2.66 grams of benzal-aniline were dissolved in 100 grams of the liquid epoxide resin used in Example 1. By the addition of 5.0 cc. of a hardener solution of 10% strength by volume of trifluoride, of which the composition is described below, there was obtained a casting composition, which became highly viscous in 24 hours and hardened completely when heated at 110° C. for 20 minutes. A cast body made with this composition had the following properties:

Impact bending strength_____ 13.7 cm. kg. per squ. cm.
Bending strength_____ 12.6 kg. per squ. mm.
Absorption of cold water (4
  days at 20° C.)_____ 0.16%.
Martens value (DIN)_____ 60° C.

The aforesaid boron trifluoride hardener solution was obtained by diluting 15.4 grams of boron trifluoride dihydrate (65% BF₃) to 100 cc. with tetrahydrofurane.

*Example 7*

20 grams of tetrahydrofurane were added to 100 grams of the epoxide residue used in Example 1, and then mixed with 7.5 grams of the boron trifluoride hardener of 8% strength used in Example 5. There was obtained a cast body, which after being hardened for 30 minutes at 60° C. (exothermic reaction), had the following properties:

Impact bending strength_____ >25.6 cm. kg. per squ. cm.
Bending strength (no break at
  maximum bending)_____ 0.54 kg. per squ. mm.
Absorption of cold water (4
  days at 20° C.)_____ 0.38%.
Martens value (DIN)_____ <20° C. not measurable.

When the hardening was carried out at room temperature with the prevention of heating up, a cast body was obtained after hardening period of one month, which had the following properties:

Impact bending strength_____ >25.6. cm. kg. per squ. cm.
Bending strength (no break at
  maximum bending)_____ 0.17 kg. per squ. mm.
Absorption of cold water (4
  days at 20° C.)_____ 0.43%.
Martens value (DIN)_____ <20° C. not measurable.

*Example 8*

75 grams of the epoxide resin used in Example 1 were heated with 4.5 grams of a boron trifluoride-monoethylamine complex in the course of 4 minutes from 20° C. up to 135° C., so that the hardener dissolved clearly. The mixture was immediately allowed to cool to 30° C., and 25 grams of tetrahydrofurane were added while stirring well.

The mixture was then introduced into an autoclave and heated for 14 hours at 150° C. There was obtained a spring hard yellowish polymerization product, which lost 7% of its original weight when heated in vacuo (20 mm. pressure of mercury), at 100° C. for 23 hours.

When tetrahydrofurane (25 grams) was subjected alone with the boron trifluoride-monoethylamine complex (1.125 grams), no polymerization took place.

*Example 9*

80 grams of the epoxide resin used in Example 1 having an epoxide content of 5.2 epoxide equivalents per kilogram of resin were heated with 20 grams of an epoxide resin having an epoxide content of 3.8 epoxide equivalents per kilogram, and obtained by the alkaline condensation of epichlorhydrin with 4:4′-dihydroxyphenyldimethylmethane, at 120° C., and 5 grams of a condensation product of one molecular proportion of octadecyl alcohol and about 35 molecular proportions of ethylene oxide were dissolved in the mixture. The whole was then allowed to cool to 60° C., and 15 grams of distilled water were added while stirring well. There was immediately formed at room temperature a stable emulsion having a paste-like consistency.

To 20 grams of this mixture were then added 2.0 cc. of a boron trifluoride hardener solution of 10% strength by volume, obtained by diluting 15.4 grams of boron trifluoride dihydrate, (65% of $BF_3$) with tetrahydrofurane to 100 cc.

The catalytic emulsion paste was then spread in a thin layer on a glass plate and allowed to dry. The resulting coating hardened at room temperature in 45 minutes, it being observed that hardening took place first where the water evaporated, that is to say, the mixture started hardening at the surface. This means that the coating should not be too thickly applied, otherwise the water in the lower regions of the coating cannot evaporate in a reasonable time.

At 60° C. the hardening took place in the course of 15 minutes. The period during which the catalyzed mixture could be used at room temperature was about 5 hours.

*Example 10*

100 grams of 1:4-butane-dioldiglycidyl ether were mixed with 300 grams of barium sulfate and 6 grams of a solution of a boron trifluoride-water-tetrahydrofurane complex used in Example 1, and the resulting mixture was applied in a thin layer to a sheet of aluminum. At room temperature the coating became dust-dry in 30 minutes. After being immersed for 24 hours in caustic soda solution of 30% strength the coating remained intact and capable of completely protecting the aluminum against corrosion.

*Example 11*

100 grams of a paste-like phenol-novolac-polyglycidyl ether, obtained from 1 molecular proportion of phenol, half a molecular proportion of formaldehyde and 3 molecular proportions of epichlorhydrin, were diluted with 10 grams of tetrohydrofurane. The resulting castable mixture was mixed with a hardener solution consisting of 4 grams of a boron trifluoride aniline complex, 5 grams of tetrahydrofurfuryl alcohol and 5 grams of tetrohydrofurane. The mass commenced to harden after 12 hours at room temperature. In order to harden it completely the cast body was heated for 12 hours at 120° C. No loss of weight was observed during the after-hardening. The Shore hardness of the cast body so obtained was 98.

*Example 12*

0.6 gram of the boron trifluoride-water-tetrahydrofurane complex described in Example 1 was mixed with 10 grams of phthalic acid diglycidyl ester (Metallon K of the firm Henkel). Strips of aluminum were adhesively united with the resin-hardener mixture so obtained. After hardening for one hour at 50° C. the adhesive bond had a tensile shear strength of 1.2 kg. per squ. mm.

*Example 13*

100 grams of [3:4-epoxy-6-methyl-cyclohexylmethyl]-3:4-epoxy-6-methyl-cyclohexane carboxylate ("EP-201" of the Union Carbide Chemical Company) were mixed with 200 grams of quartz meal, and the mixture was cooled to 10° C. There was then added a solution of 4 grams of a boron trifluoride-aniline complex with 16 grams of tetrahydrofurane. The mixture hardened in one minute, and a cast body can be formed having a Shore hardness of 98.

What is claimed is:
1. A process which comprises reacting (1) a 1,2-epoxide compound having a 1,2-epoxide equivalency greater than 1 with (2) tetrahydrofurane, which comprises contacting (1) and (2) with (3) boron trifluoride, and (4) a complex-forming compound capable of forming a stable complex with boron trifluoride, selected from the group consisting of water, ammonia, ethylamine, ethylenediamine, monoethanolamine, piperidine, triethanolamine, urea, hexamethylene tetramine, trimethylamine, pyridine, aniline, toluidine and Schiff's bases, about 0.2 to about 3.0 parts by weight of the complex forming compound being employed for each part by weight of boron trifluoride and 5–50 parts by weight of tetrahydrofurane for every 100 parts by weight of the 1,2-epoxide compound, and curing the reaction product.

2. A process which comprises reacting (1) a 1,2-epoxide compound having a 1,2-epoxide equivalency greater than 1 with (2) tetrahydrofurane, which comprises contacting (2) and (2) with (3) boron trifluoride, and (4) a complex-forming compound capable of forming a stable complex with boron trifluoride, selected from the group consisting of water, ammonia, ethylamine, ethylenediamine, monoethanolamine, piperidine, triethanolamine, urea, hexamethylene tetramine, trimethylamine, pyridine, aniline, toluidine and Schiff's bases, about 0.2 to about 3.0 parts by weight of the complex-forming compound being employed for each part by weight of boron trifluoride and 10–30 parts by weight of tetrahydrofurane for every 100 parts by weight of the 1,2-epoxide compound, and curing the reaction product.

3. A process which comprises reacting (1) a 1,2-epoxide compound having a 1,2-epoxide equivalency greater than 1 with (2) tetrahydrofurane, which comprises contacting (1) and (2) with (3) boron trifluoride, and (4) a complex-forming compound capable of forming a stable complex with boron trifluoride, selected from the group consisting of water, ammonia, ethylamine, ethylenediamine, monoethanolamine, piperidine, triethanolamine, urea, hexamethylene tetramine, trimethylamine, pyridine, aniline, toluidine and Schiff's bases, about 0.2 to about 3.0 parts by weight of the complex-forming compound being employed for each part by weight of boron trifluoride and not more than one mol of tetrahydrofurane for each 1,2-epoxide equivalent of the 1,2-epoxide compound, and curing the reaction product.

4. A process which comprises reacting (1) a 1,2-epoxide compound having a 1,2-epoxide equivalency greater than 1 with (2) tetrahydrofurane, which comprises contacting (1) and (2) with (3) boron trifluoride, and (4) water, about 0.2 to about 3 parts by weight of water being employed for each part by weight of boron trifluoride and 5–50 parts by weight of tetrahydrofurane for every 100 parts by weight of the 1,2-epoxide compound, and curing the reaction product.

5. A process which comprises reacting (1) a 1,2-epoxide compound having a 1,2-epoxide equivalency greater than 1 with (2) tetrahydrofurane, which comprises contacting (1) and (2) with (3) boron trifluoride, and (4) water, about 0.5 to about 3 parts by weight of water being employed for each part by weight of boron trifluoride and 5–50 parts by weight of tetrahydrofurane for every 100 parts by weight of the 1,2-epoxide compound, and curing the reaction product.

6. A process as claimed in claim 3, wherein the 1,2-epoxide compound is a polyglycidyl ether of a polyhydric phenol.

References Cited in the file of this patent
UNITED STATES PATENTS

| 2,847,343 | Kohn | Aug. 12, 1958 |
| 2,864,804 | Shokal et al. | Dec. 16, 1958 |

FOREIGN PATENTS

| 200,876 | Australia | Feb. 15, 1956 |
| 898,269 | France | July 3, 1944 |